United States Patent
Kawamura et al.

(10) Patent No.: US 8,014,882 B2
(45) Date of Patent: Sep. 6, 2011

(54) PARTICULAR PROGRAM DETECTION DEVICE, METHOD, AND PROGRAM

(75) Inventors: Takashi Kawamura, Osaka (JP); Haruyo Ohkubo, Osaka (JP); Kazuhiro Kuroyama, Osaka (JP); Masayuki Misaki, Hyogo (JP); Meiko Masaki, Osaka (JP); Toshihiko Date, Nara (JP)

(73) Assignee: Panasonic Corporation, Osaka (JP)

( * ) Notice: Subject to any disclaimer, the term of this patent is extended or adjusted under 35 U.S.C. 154(b) by 1183 days.

(21) Appl. No.: 10/584,088

(22) PCT Filed: Mar. 28, 2005

(86) PCT No.: PCT/JP2005/005676
§ 371 (c)(1),
(2), (4) Date: Jun. 22, 2006

(87) PCT Pub. No.: WO2005/098818
PCT Pub. Date: Oct. 20, 2005

(65) Prior Publication Data
US 2007/0154032 A1     Jul. 5, 2007

(30) Foreign Application Priority Data
Apr. 6, 2004  (JP) ................. 2004-111801

(51) Int. Cl.
*G06F 17/00*   (2006.01)
*H04N 5/14*    (2006.01)
*G10L 11/06*   (2006.01)
(52) U.S. Cl. ................. 700/94; 348/700; 704/215
(58) Field of Classification Search ........... 700/94; 348/700; 704/215
See application file for complete search history.

(56) References Cited

U.S. PATENT DOCUMENTS

| | | | |
|---|---|---|---|
| 4,081,836 A * | 3/1978 | Skinner | 348/627 |
| 4,390,904 A | 6/1983 | Johnston et al. | |
| 5,333,091 A | 7/1994 | Iggulden et al. | |
| 5,841,385 A * | 11/1998 | Xie | 341/139 |
| 5,911,029 A | 6/1999 | Sakaguchi et al. | |
| 5,987,210 A | 11/1999 | Iggulden et al. | |
| 6,049,607 A * | 4/2000 | Marash et al. | 379/406.08 |
| 7,356,464 B2 * | 4/2008 | Stella et al. | 704/210 |
| 2002/0054242 A1 * | 5/2002 | Suito et al. | 348/700 |
| 2003/0016945 A1 | 1/2003 | Nakamura | |

FOREIGN PATENT DOCUMENTS

JP     58-173911     10/1983
(Continued)

*Primary Examiner* — Davetta W Goins
*Assistant Examiner* — Daniel Sellers
(74) *Attorney, Agent, or Firm* — Wenderoth Lind & Ponack, L.L.P.

(57) ABSTRACT

A particular program detection device detecting a particular program segment even in a program signal contaminated with noise by adaptively modifying a detection sensitivity for a scene change point. A noise level detecting section detects a noise level of a program signal outputted from a signal input section. Based on the detected noise level, a detection sensitivity determining section determines a detection sensitivity which is used when a silent portion of the program signal is determined by a silent portion detecting section. In accordance with the determined detection sensitivity, the silent portion detecting section detects a portion having a low audio level of the program signal as a silent portion. A particular program determining section calculates a time difference between each silent portion and a silent portion following this, and based on the calculated time difference, determines whether or not the silent portion is a particular program.

9 Claims, 10 Drawing Sheets

FOREIGN PATENT DOCUMENTS

| | | |
|---|---|---|
| JP | 62-287297 | 12/1987 |
| JP | 63-148788 | 6/1988 |
| JP | 08-185196 | 7/1996 |
| JP | 09-219835 | 8/1997 |
| JP | 09-307841 | 11/1997 |
| JP | 2858758 | 12/1998 |
| JP | 2000-165807 | 6/2000 |
| JP | 2001-228893 | 8/2001 |
| JP | 2002-268683 | 9/2002 |
| JP | 2003-101939 | 4/2003 |

* cited by examiner

PARTICULAR PROGRAM DETECTION DEVICE, METHOD, AND PROGRAM

BACKGROUND OF THE INVENTION

1. Field of Invention

The present invention relates to a particular program detection device, method, and program. More particularly, the present invention relates to a particular program detection device and a particular program detection method of detecting a particular program segment which is present in a program signal of a television, a radio, or the like, and also relates to a program for executing the method.

2. Description of the Related Art

Conventionally, as a method of detecting a particular program segment, such as a CM or the like, which is present in a television program or the like composed of audio and moving images or a radio program or the like composed only of audio, for example, a method of detecting points where audio or moving images change (scene change points), and determining a time interval between the scene change points to detect a particular program segment, is commonly known. Hereinafter, such a particular program detection method will be described with reference to FIG. 10.

Figure 10:
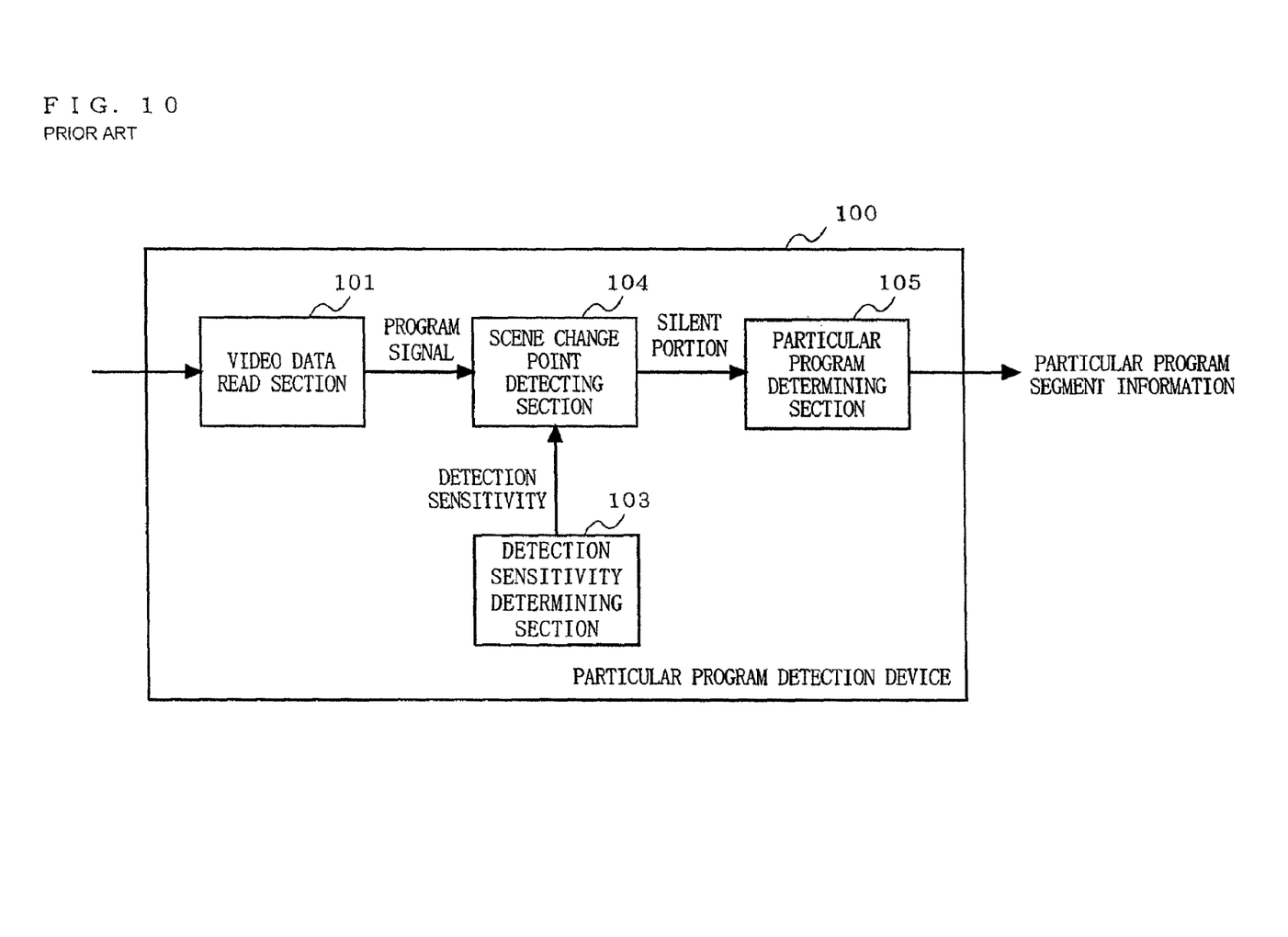
FIG. 10 is a block diagram illustrating an exemplary configuration of a conventional particular program detection device 100.

FIG. 10 is a block diagram illustrating an exemplary configuration of a conventional particular program detection device 100. The particular program detection device 100 comprises a video data read section 101, a detection sensitivity determining section 103, a scene change point detecting section 104, and a particular program determining section 105. The particular program detection device 100 sets an arbitrary threshold value for detection sensitivity, and based on the value, detects scene change points of audio or moving images in a program to detect a particular program.

The video data read section 101 reads out video data of a program from a storage device, a memory, or the like. A specific example of the video data read section 101 is a device of reading out video data from an HDD included in an HDD recorder, a DVD medium loaded in a DVD recorder, or the like. The detection sensitivity determining section 103 sets a detection sensitivity used when scene change points of audio or moving images are detected in the scene change point detecting section 104. The detection sensitivity corresponds to a threshold value with respect to a characteristic amount, which is a measure of changing of audio or moving images. The setting of the detection sensitivity may be arbitrarily changed by the user or may be fixed before shipment of the device.

The scene change point detecting section 104 detects scene change points of audio or moving images in accordance with the detection sensitivity set by the detection sensitivity determining section 103. A scene change point can be detected using either or both of moving image data and audio data. In the case of image data, examples of a scene change point includes a light intensity change point, a blackout inserted point, and the like. In the case of audio data, an example of a scene change point is a point where a level of audio data becomes a predetermined value or less.

The particular program determining section 105 uses a time interval between scene change points detected by the scene change point detecting section 104 to determine a particular program segment. For example, in the case of CMs, a CM usually has a duration of 15 seconds, 30 seconds, 60 seconds, or 90 seconds, and therefore, in order to detect a CM segment, it is determined whether or not the time interval takes one of these values. In this manner, the conventional particular program detection device 100 detects a CM segment in a program signal.

[Patent Document 1] Japanese Patent No. 2858758

BRIEF SUMMARY OF THE INVENTION

However, in the conventional particular program detection device 100 configured as described above, when the device 100 receives a broadcast program signal in a poor reception environment (so that the received signal is contaminated with noise, or when a signal is contaminated with encoding/decoding noise which occurs during a process of decoding a signal which has been once encoded, e.g., when recording is performed on a personal computer (particularly, encoding performance is often poor)) the detection of scene change points is not satisfactorily achieved and the performance of detection of a particular program segment is impaired.

Particularly, in the case of analog broadcast, the reception condition of each station varies depending on the region, so that the detection is satisfactory for some stations and is not satisfactory for other stations, i.e., the performance varies. Also in the case of digital broadcast, it is necessary to take measures against reception error, however, this is not taken into consideration in the conventional configuration.

There are software encoders which can be freely installed and hardware encoders which are configured as LSIs and perform high-speed processing. Some software encoders have a limitation on the performance, so that the encoding performance thereof is poor.

Therefore, an object of the present invention is to provide a particular program detection device, method, and program capable of detecting a particular program segment in a program signal, even if the signal is contaminated with noise, by adaptively modifying a detection sensitivity for a scene change point, depending on a difference between analog and digital, a difference between the broadcast radio wave intensities or reception conditions of program signals, a difference between encoders, or the like.

The present invention is directed to a particular program detection device for detecting a particular program segment in a program signal including at least audio data of a program. To achieve the above-described object, the particular program detection device of the present invention comprises a noise level detecting section, a detection sensitivity determining section, a silent portion detecting section, and a particular program determining section.

The noise level detecting section detects a noise level of the audio data included in the program signal. The detection sensitivity, determining section determines a detection sensitivity which is used when a particular program is detected, based on the noise level detected by the noise level detecting section. The silent portion detecting section detects a silent portion of the audio data included in the program signal in accordance with the detection sensitivity determined by the detection sensitivity determining section. The particular program determining section determines a time interval between each silent portion detected by the silent portion detecting section to determine a particular program segment.

Here, the particular program detection device can further comprises a noise level learning section for learning an association of the noise level detected by the noise level detecting section with a noise level which has been detected in the past, and a noise level storing section of storing a noise level learned by the noise level learning section. With this configuration, the detection sensitivity determining section can determine a detection sensitivity which is used when a particular program is detected, based on the learned noise level stored in the noise level storing section.

The particular program detection device may further comprise a program information obtaining section of obtaining program information from the program signal. With this configuration, the noise level storing section can store the noise level learned by the noise level learning section in association with the program information obtained by the program information obtaining section, and the detection sensitivity determining section can obtain the learned noise level associated with the program information from the noise level storing section in accordance with the program information obtained by the program information obtaining section, and can determine the learned noise level as a detection sensitivity which is used when a particular program is detected.

Typically, the particular program detection device further comprises a broadcast reception section of receiving broadcast waves carried in the program signal, and outputting the received program signal to the noise level detecting section and the silent portion detecting section, or a data read section of reading the program signal from a storage device in which the program signal is recorded, and outputting the read program signal to the noise level detecting section and the silent portion detecting section.

Preferably, the silent portion detecting section subjects a minimum value of the audio data included in the program signal to a minimum hold process. When a particular program is a CM, a time constant which causes a minimum hold value to increase is preferably determined so that the minimum hold value is clipped to a predetermined value in 15 seconds which is a minimum time which can be taken by a CM.

A process performed by each component of the above-described particular program detection device can be achieved as a particular program detection method which provides a series of process procedures. Specifically, the particular program detection method detects a noise level of the audio data included in the program signal, determines a detection sensitivity, which is used when a particular program is detected, based on the detected noise level, detects a silent portion of the audio data included in the program signal in accordance with the determined detection sensitivity, and determines a time interval between each detected silent portion to determine a particular program segment.

Preferably, the particular program detection method is provided in the form of a program for causing a particular program detection device to execute a series of process procedures. The program may be recorded in a computer readable recording medium.

Note that a portion of the functional blocks of the above-described particular program detection device may be implemented as an integrated circuit (LSI).

According to the present invention, it is possible to reliably detect a point where a main program is changed to a CM and a point where a CM is changed to a main program (scene change points). In addition, the detection sensitivity is modified, depending on the noise level of a program signal, thereby making it possible to maintain the detection performance with respect to a signal contaminated with noise. Further, the detection performance with respect to a signal contaminated with noise can be maintained by learning a past noise level. Furthermore, by learning and storing a past noise level in association with program information, a current noise condition can be estimated based on past noise information, so that a silent portion can be detected, depending on the noise level.

DESCRIPTION OF THE REFERENCE CHARACTERS 1 to 3 particular program detection device
11 signal input section
12 noise level detecting section
13, 23, 33, 103 detection sensitivity determining section
14 silent portion detecting section
15, 105 particular program determining section
21, 31 noise level learning section
22, 32 noise level storing section
34 program information obtaining section
101 video data read section
104 scene change point detecting section

DETAILED DESCRIPTION OF THE INVENTION

First Embodiment

Figure 1:
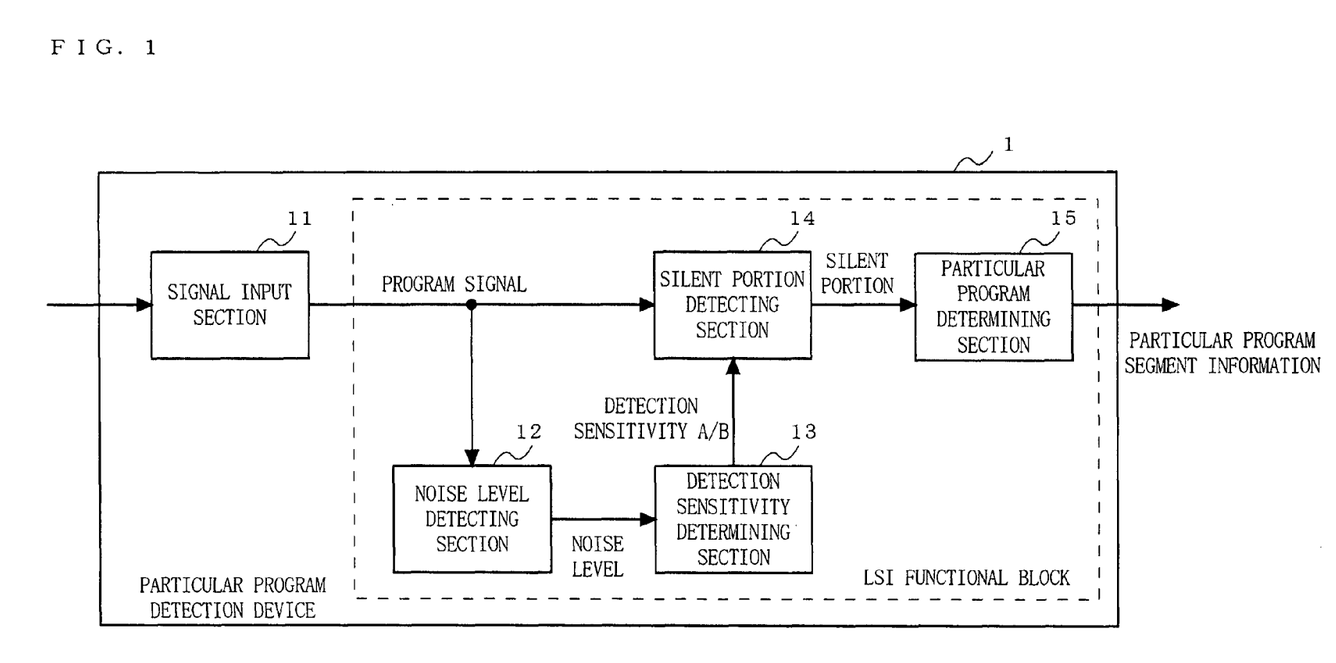
FIG. 1 is a block diagram illustrating a configuration of a particular program detection device 1 according to a first embodiment of the present invention.
Figure 2:
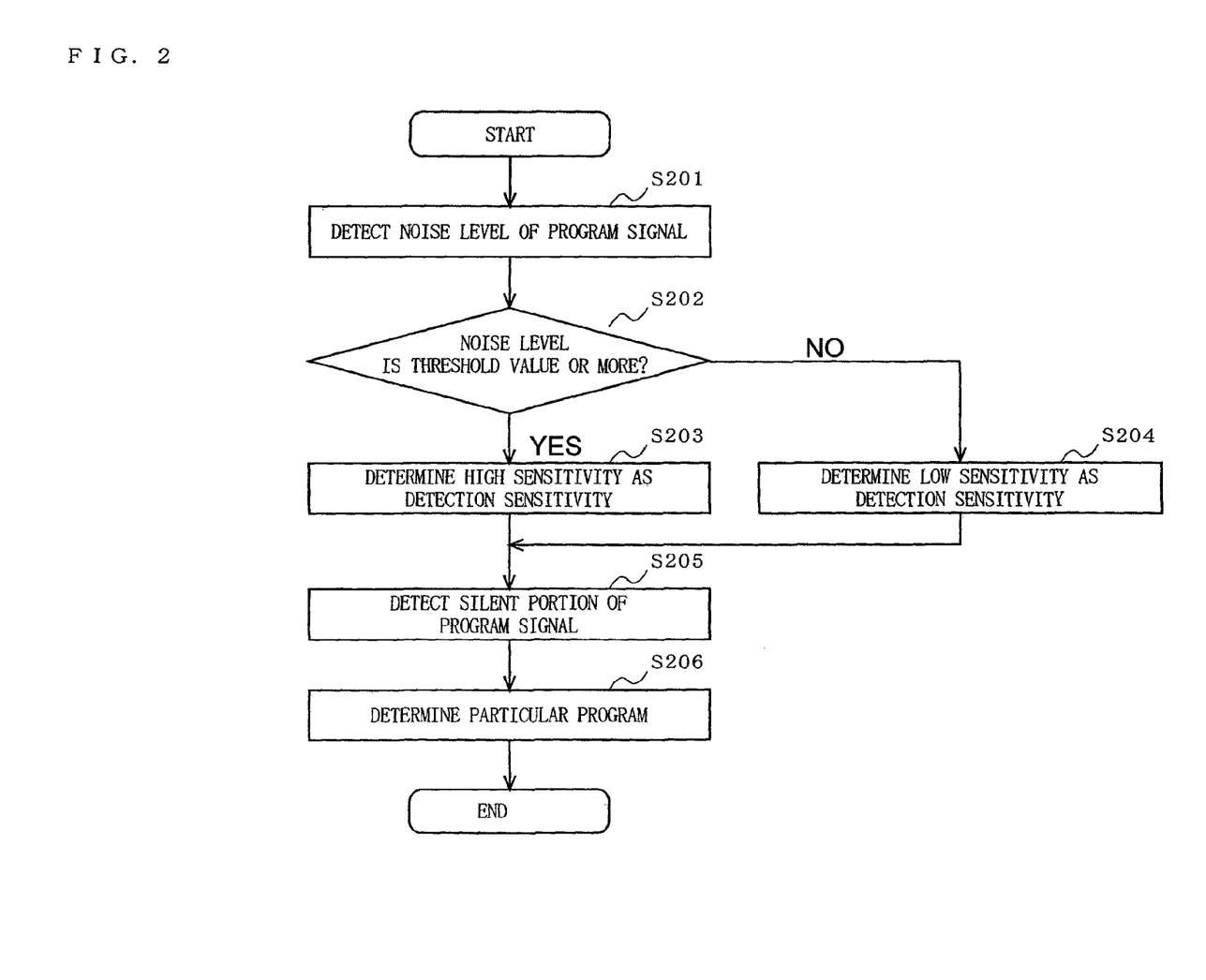
FIG. 2 is a flowchart illustrating a process procedure of a particular program detection method according to the first embodiment of the present invention.

FIG. 1 is a block diagram illustrating a configuration of a particular program detection device 1 according to a first embodiment of the present invention. In FIG. 1, the particular program detection device 1 comprises a signal input section 11, a noise level detecting section 12, a detection sensitivity determining section 13, a silent portion detecting section 14, and a particular program determining section 15. FIG. 2 is a flowchart illustrating a process procedure of a particular program detection method according to the first embodiment of the present invention.

The signal input section 11 is a section which receives a signal of a program composed of audio and moving images (a television program, etc.), or a signal of a program composed only of audio (a radio program, etc.). These programs include a particular program represented by a CM in addition to a main program. For example, when a program signal is broadcast from a broadcast station, the signal input section 11 is composed of a broadcast reception section (a tuner, etc.) which receives broadcast waves carrying the program signal. When a program signal is recorded in a storage device, such as an HDD, a DVD, a flash memory, or the like, the signal input section 11 is composed of a data read section capable of reading out the program signal. The process of the data read device also includes, for example, demultiplexing data in which audio and moving images are multiplexed, or decoding encoded audio data and moving image data. Note that a program signal may be either digital or analog.

Figure 3A:
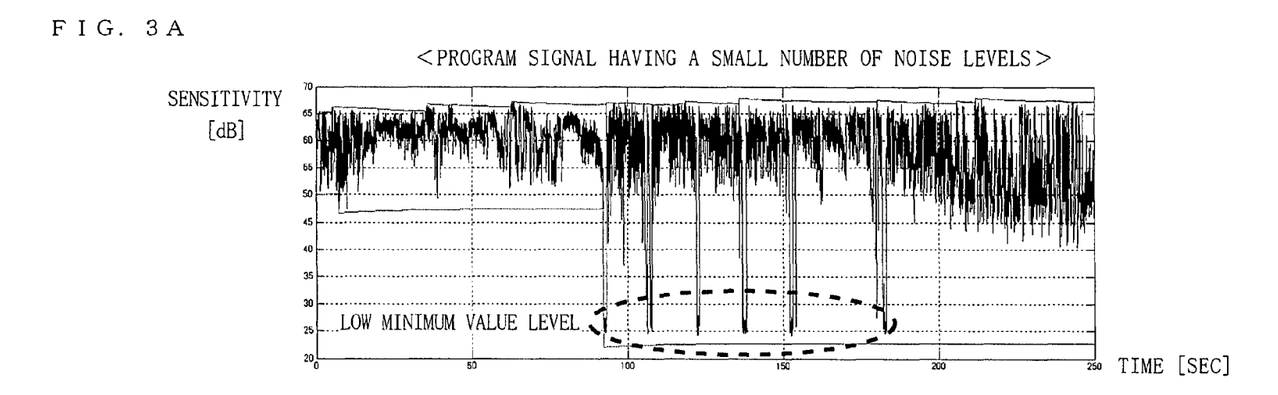
FIG. 3A is a diagram illustrating an exemplary program signal having a small number of noises.
Figure 3B:
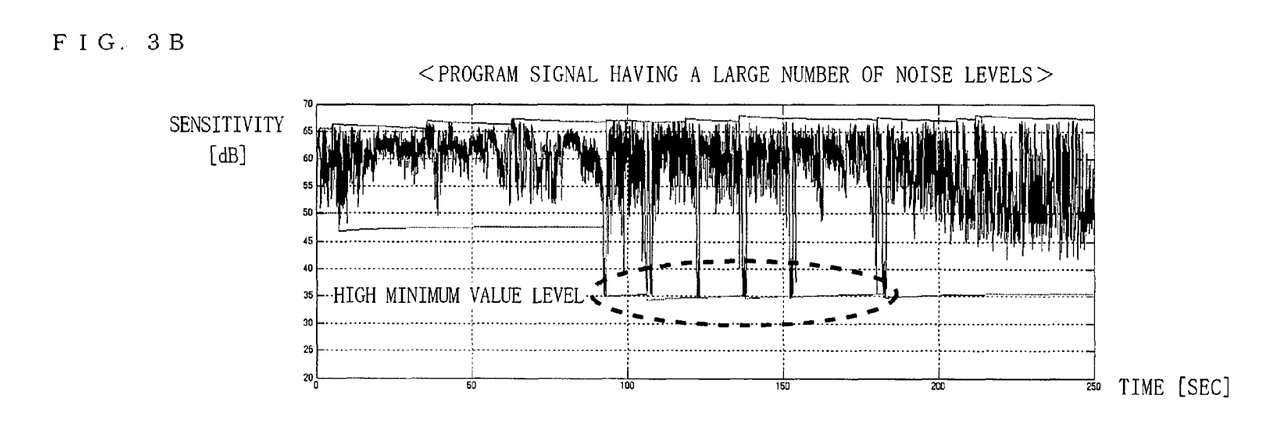
FIG. 3B is a diagram illustrating an exemplary program signal having a large number of noises.

The noise level detecting section 12 detects a noise level of a program signal output from the signal input section 11 (step S201). The detection is performed by the following method, taking it into consideration that a program signal having a large number of noises has a high minimum value level (silent portion) (FIGS. 3A and 3B).

Figure 4A:
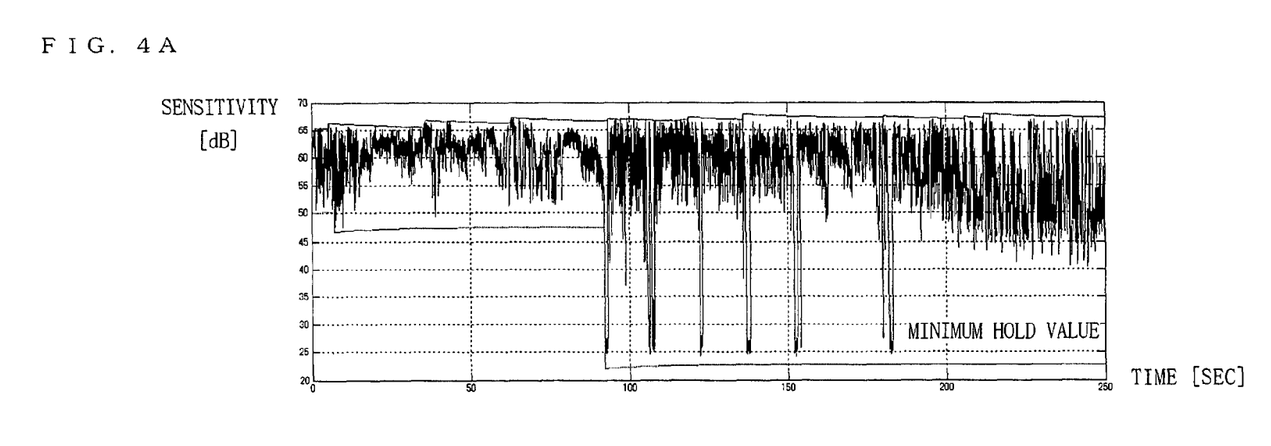
FIG. 4A is a diagram (minimum hold values) illustrating an exemplary noise level detecting process performed by a noise level detecting section 12.

A first method is to detect a minimum hold value which is an evaluation value following a minimum value of a power envelope of a program signal (FIG. 4A). The minimum hold value follows a signal level which is smaller than an immediately previous hold level every time the level is detected, and gradually increases with a predetermined time constant during the time when a small signal level is not detected. With the first method, as a result of detection, a minimum hold value which increases in proportion to the amount of noise in a program signal is obtained.

Figure 4B:
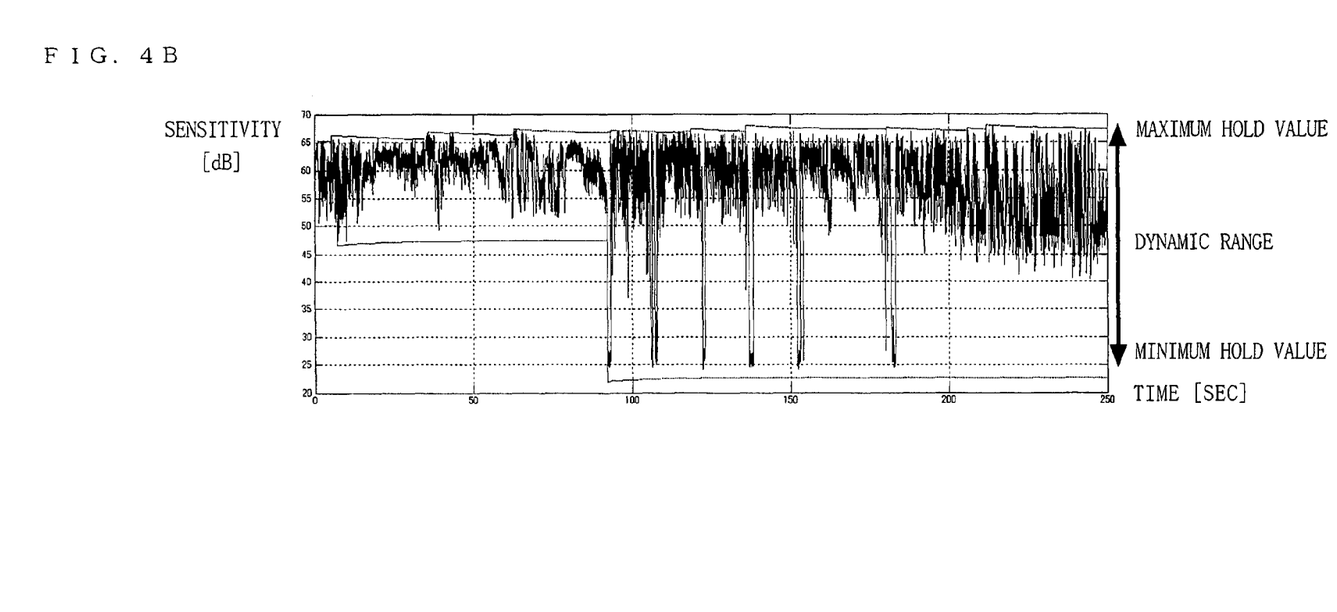
FIG. 4B is a diagram (dynamic range values) illustrating an exemplary noise level detecting process performed by a noise level detecting section 12.

A second method is to detect a difference between a maximum hold value which is an evaluation value following a maximum value and the minimum hold value, i.e., a dynamic range value (FIG. 4B). The maximum hold value follows a signal level which is larger than an immediately previous hold level every time the level is detected, and gradually decreases with a predetermined time constant during the time when a large signal level is not detected. With the second method, as a result of detection, a dynamic range value decreases in proportion to the amount of noise in a program signal.

Based on a noise level (the minimum hold value or the dynamic range value) detected by the noise level detecting section 12, the detection sensitivity determining section 13 determines a detection sensitivity which is used when a silent portion of a program signal is detected in the silent portion detecting section 14 (steps S202 to S204). The detection sensitivity is a threshold value of an audio level which is used to determine whether or not a portion is a silent portion. Typically, two detection sensitivities, i.e., a high sensitivity and a low sensitivity, are previously prepared. One of the detection sensitivities is determined, depending on the noise level (the level minimum hold value or the dynamic range value) with respect to the predetermined threshold value. For example, when the noise level is small, the low sensitivity is determined, and when the noise level is large, the high sensitivity is determined. Note that the detection sensitivities determined depending on the noise level are not limited to the two detection sensitivities (the high sensitivity and the low sensitivity), and three or more detection sensitivities may be used, where a plurality of threshold values are provided.

As described above, by increasing the detection sensitivity when the noise level is high, it is possible to reliably detect a silent portion between a main-program segment and a CM segment and a silent portion between a CM segment and a CM segment which are otherwise buried in noise, though the silent portion detecting section 14 more frequently makes error detection in a main program as described below.

Figure 5:
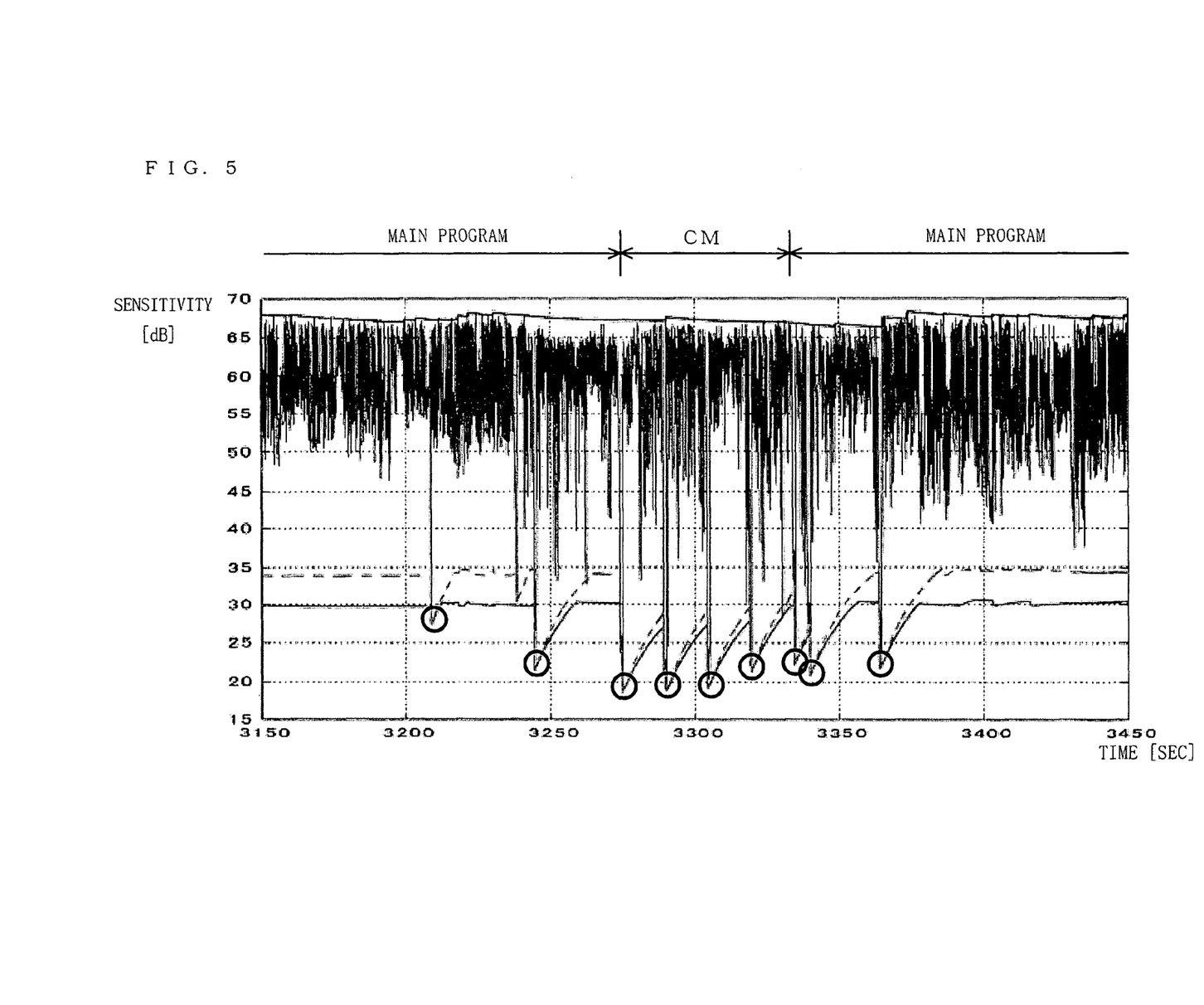
FIG. 5 is a diagram (low sensitivity) illustrating an example in which a silent portion is detected from a program signal.
Figure 6:
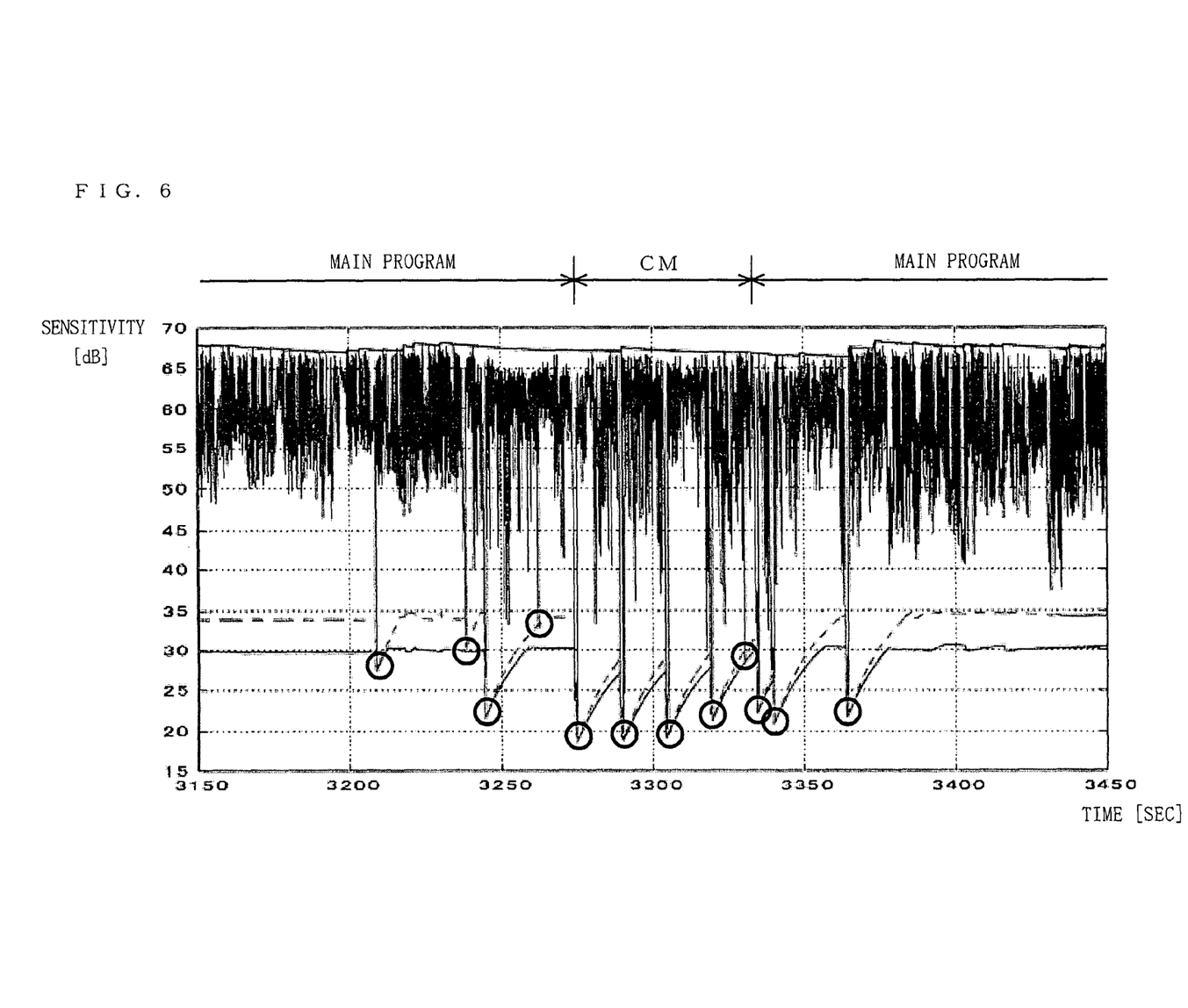
FIG. 6 is a diagram (high sensitivity) illustrating an example in which a silent portion is detected from a program signal.

The silent portion detecting section 14 receives a program signal from the signal input section 11, and detects a portion having a small audio level of the program signal, as a silent portion, in accordance with the detection sensitivity determined by the detection sensitivity determining section 13 (step S205). Generally, when scenes are changed, it is often that audio is faded out/faded in, or silence is inserted. For example, FIG. 5 is a diagram illustrating an example in which a silent portion is detected from a certain program. As can be seen from FIG. 5, a portion having a low audio level is clearly present between a main-program segment and a CM segment and between a CM segment and a CM segment. Therefore, the silent portion detecting section 14 observes the audio level, and detects, as a scene change point, a portion at which the audio level is smaller than or equal to a predetermined value given as a detection sensitivity (portions enclosed with circles in FIG. 5), thereby distinguishing a main-program segment from a CM segment. FIG. 6 is a diagram illustrating an example in which a silent portion is detected from a program, where a detection sensitivity is higher than that of FIG. 5.

Here, if an audio signal itself includes noise, all portions having small levels may be buried in noise, so that detection may not be satisfactorily achieved. Therefore, in the silent portion detecting section 14 of the present invention, in order to appropriately detect a silent portion of a CM, a detected audio level is subjected to a minimum hold process (see FIGS. 5 and 6). In addition, in the silent portion detecting section 14 of the present invention, in order to reliably determine a CM in the particular program determining section 15 described below, it is taken into consideration that the minimum time of a CM is 15 seconds, and a gradually increasing amount is adjusted in the minimum hold process so that, if 15 seconds or more has elapsed since a minimum value, the audio level is clipped at one which is determined by the detection sensitivity (see FIGS. 5 and 6). For example, if a level where a maximum hold value is −40 dB is set as a clip line of a minimum hold value, i.e., a detection sensitivity, it is possible to prevent error detection at an audio (speech)-centered portion of a main program in which a silent portion frequently occurs, to some extent.

Figure 7:
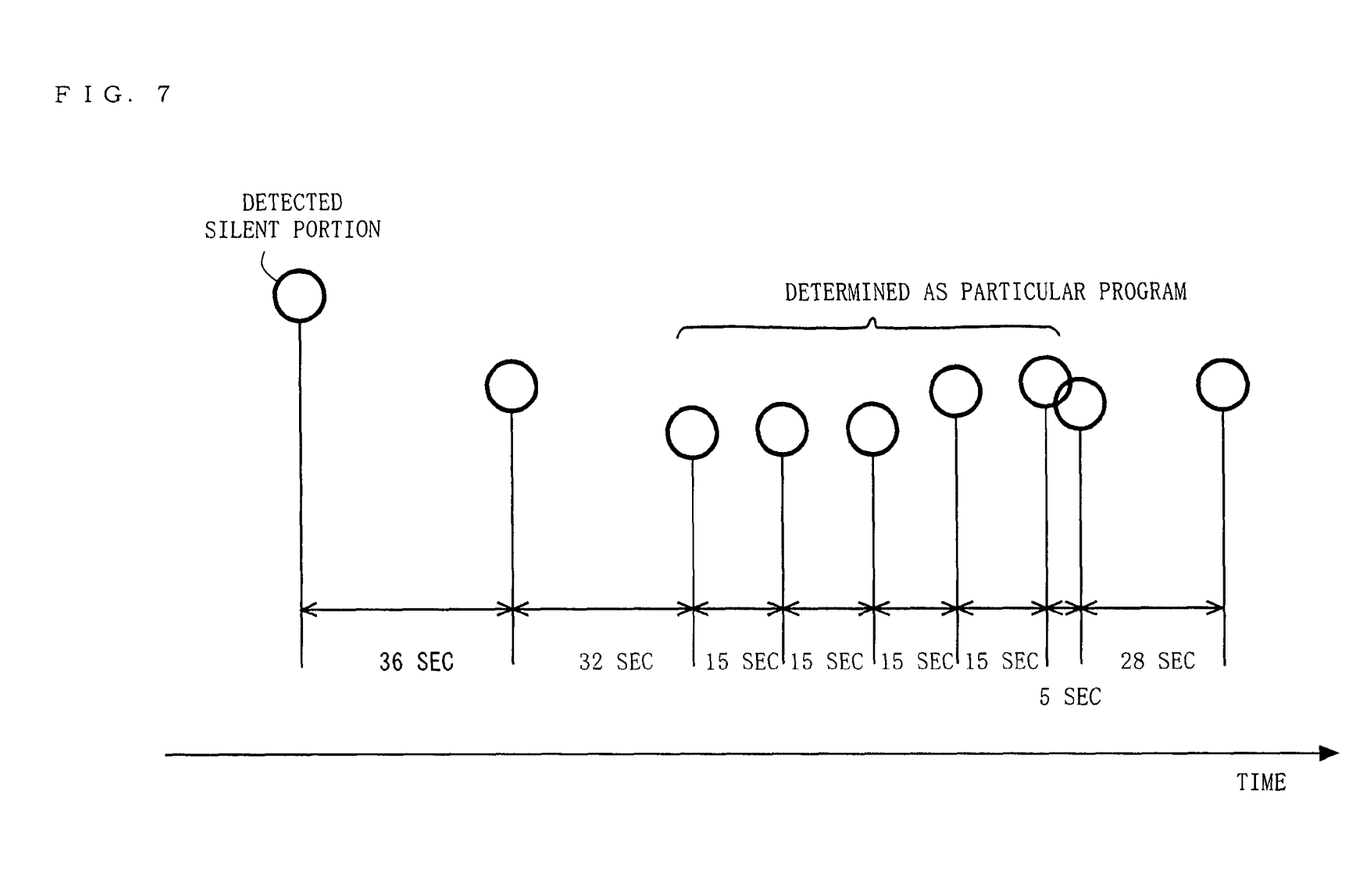
FIG. 7 is a diagram illustrating an exemplary particular program determining process performed by a particular program determining section 15.

For each silent portion detected by the silent portion detecting section 14, the particular program determining section 15 calculates a time difference between the silent portion and a silent portion following this, and based on the calculated time difference, determines whether the silent portion is at the start or the end of a CM segment, or at a point in a main-program segment (step S206). The determination is performed as in FIG. 7, for example. As is well known, a CM is produced to have a duration of an integral multiple of 15 seconds, such as 15 seconds, 30 seconds, 60 seconds, or 90 seconds. In view of this, the particular program determining section 15 obtains a time interval between silent portions and confirms whether or not the time interval is an integral multiple of 15 seconds. Thereafter, the particular program determining section 15 determines a time interval between silent portions which is an integral multiple of 15 seconds, as a particular program, such as a CM or the like. Note that, in order to remove the influence of error detection of a silent portion when the detection sensitivity is increased, a time difference between an silent portion and a plurality of silent portions following the silent portion may be respectively calculated, and based on evaluation of a plurality of time differences thus calculated, it may be determined whether the silent portion is at the start or the end of a CM segment, or at a point in a main-program segment.

As described above, according to the particular program detection device and method of the first embodiment of the present invention, it is possible to reliably detect a point where a main program is changed to a CM and a point where a CM is changed to a main program (scene change points). In addition, the detection sensitivity is modified, depending on the noise level of a program signal, thereby making it possible to maintain the detection performance with respect to a signal contaminated with noise.

Second Embodiment

Figure 8:
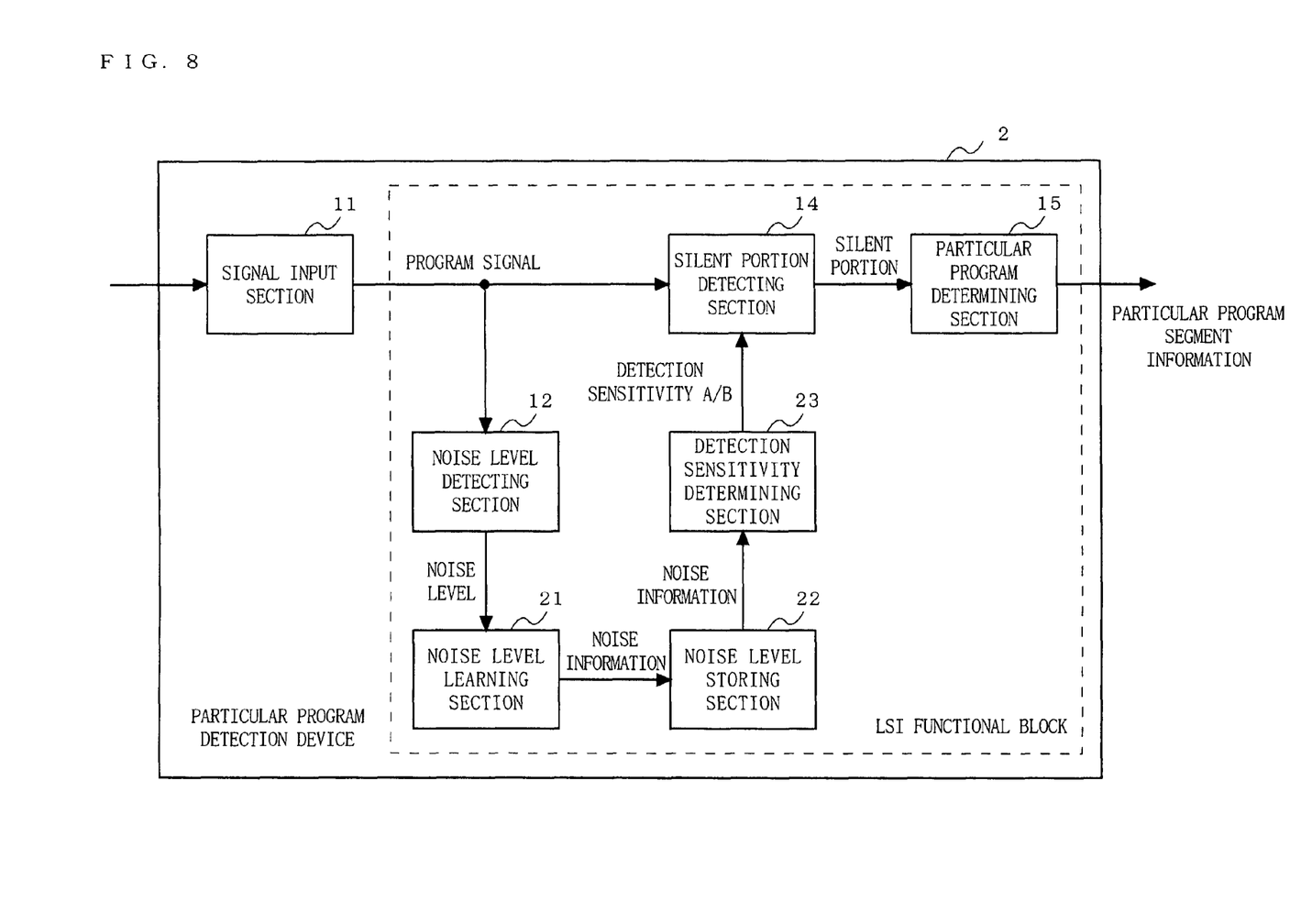
FIG. 8 is a block diagram illustrating a configuration of a particular program detection device 2 according to a second embodiment of the present invention.

FIG. 8 is a block diagram illustrating a configuration of a particular program detection device 2 according to a second embodiment of the present invention. In FIG. 8, the particular program detection device 2 comprises a signal input section 11, a noise level detecting section 12, a detection sensitivity determining section 23, a silent portion detecting section 14, a particular program determining section 15, a noise level learning section 21, and a noise level storing section 22.

As illustrated in FIG. 8, the particular program detection device 2 of the second embodiment is different from the particular program detection device 1 of the first embodiment in configurations of the noise level learning section 21, the noise level storing section 22, and the detection sensitivity determining section 23. Hereinafter, the same components between the first and second embodiments will not be described, and different configurations therebetween will be described.

The noise level learning section 21 learns an association of a noise level of a program signal detected by the noise level detecting section 12 with a noise level which has been detected in the past. The learning is performed in order to prevent a detection sensitivity determined by the detection sensitivity determining section 23 from being excessively associated with a variation in the noise level due to a temporal change in the program signal, and therefore, being frequently changed. For example, the noise level learning section 21 may be configured as a low-pass filter or the like. The learning may be invariably performed with respect to an input program signal irrespective of whether or not the particular program detection and determination are actually performed. Particularly, in the case of timer recording, assuming that a CM segment is present in the vicinity of a start end or a finish end of a program signal stream, only segments in the vicinity of the start end and the finish end may be learned. In addition, learning may be performed with respect to a stream immediately before the start of recording.

The noise level storing section 22 stores a noise level learned by the noise level learning section 21. The noise level storing section 22 may be any storage device, such as a flash memory, a DRAM, an HDD, a temporary storage space, or the like. Based on the learned noise level stored in the noise level storing section 22, the detection sensitivity determining section 23 determines a detection sensitivity which is used when a silent portion of a program signal is detected in the silent portion detecting section 14.

As described above, according to the particular program detection device and method of the second embodiment of the present invention, in addition to the effect described in the first embodiment, the detection performance with respect to a signal contaminated with noise can be maintained by learning a past noise level.

Third Embodiment

Figure 9:
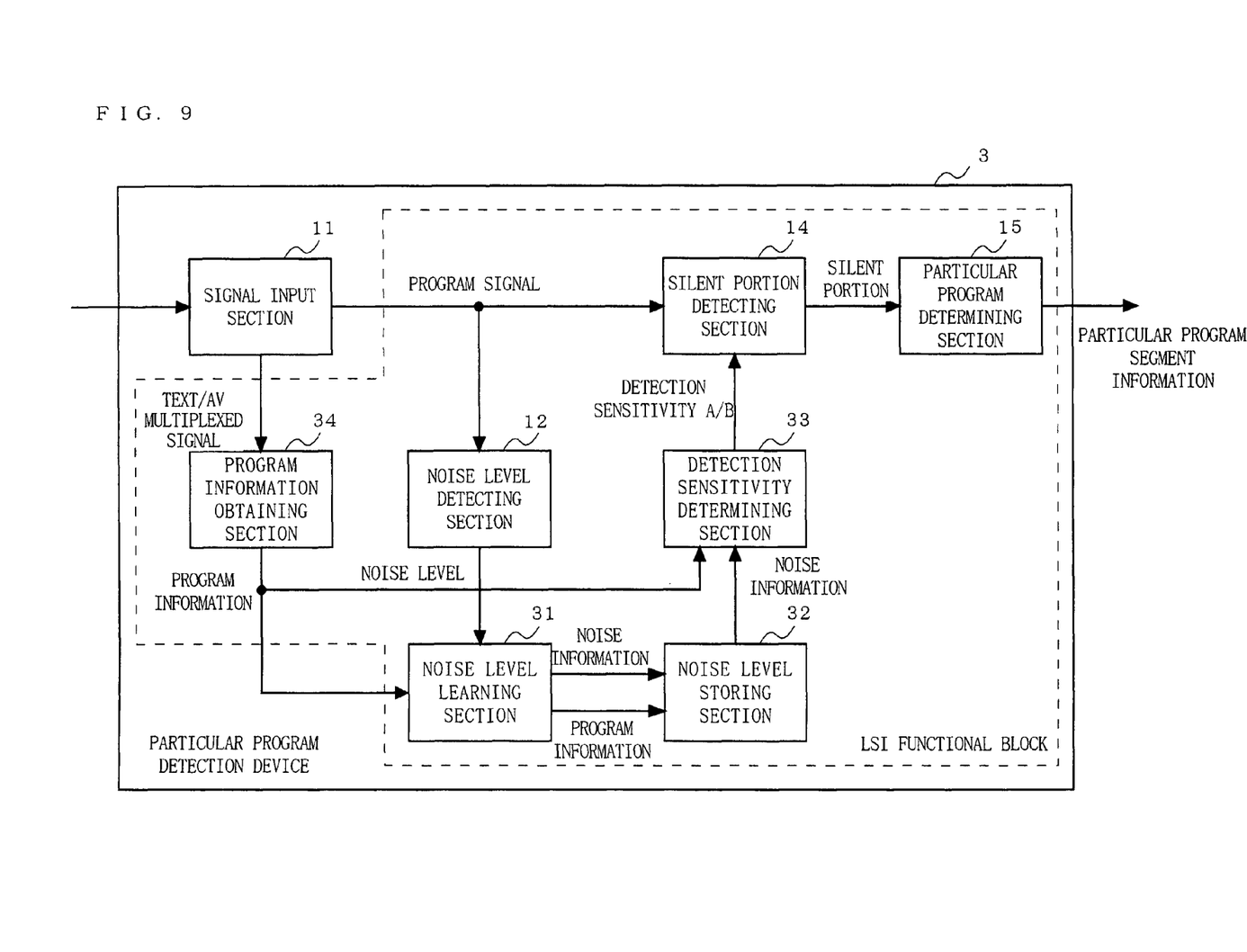
FIG. 9 is a block diagram illustrating a configuration of a particular program detection device 3 according to a third embodiment of the present invention.

FIG. 9 is a block diagram illustrating a configuration of a particular program detection device 3 according to a third embodiment of the present invention. In FIG. 9, the particular program detection device 3 comprises a signal input section 11, a noise level detecting section 12, a detection sensitivity determining section 33, a silent portion detecting section 14, a particular program determining section 15, a noise level learning section 31, a noise level storing section 32, and a program information obtaining section 34.

As illustrated in FIG. 9, the particular program detection device 3 of the third embodiment is different from the particular program detection device 2 of the second embodiment in configurations of the noise level learning section 31, the noise level storing section 32, the detection sensitivity determining section 33, and the program information obtaining section 34. Hereinafter, the same components between the second and third embodiments will not be described, and different configurations therebetween will be described.

The program information obtaining section 34 obtains program information about a program signal received by the signal input section 11. Examples of the program information include information about a channel on which a program is broadcast, information about a genre of a program (e.g., drama, sports, news, variety, etc.), and the like. When the signal input section 11 is a tuner which receives broadcast waves, the program information is obtained from a tuning state of a tuner, an electronic program guide carried with broadcast waves, or the like. Alternatively, the program information may be obtained from an external portal site via internet connection. On the other hand, when the signal input section 11 is a device which reads out data from a storage device, the program information stored in the storage device can be read out along with data.

The program information obtained by the program information obtaining section 34 is output to the noise level learning section 31 and the detection sensitivity determining section 33. The noise level learning section 31 performs learning with respect to a noise level of a program signal detected by the noise level detecting section 12, and associates the result of the learning with the program information obtained by the program information obtaining section 34. The meaning of the learning is the same as that which has been described with respect to the noise level learning section 21.

The noise level storing section 32 stores the learned noise level associated with the program information by the noise level learning section 31. The noise level storing section 32 may be any storage device, such as a flash memory, a DRAM, an HDD, a temporary storage space, or the like.

In accordance with program information provided from the program information obtaining section 34, the detection sensitivity determining section 33 obtains the learned noise level associated with the program information from the noise level storing section 32, and determines the learned noise level as a detection sensitivity which is used when a silent portion of a program signal is detected in the silent portion detecting section 14.

As described above, by using channel information about a program, the noise level learning section 31 can previously learn a noise level for each channel, and the silent portion detecting section 14 can execute silent portion detection which is adaptive to a good/poor reception condition for each channel. For example, in the case of analog broadcast, a noise level may be separately learned for each channel, and in the case of digital broadcast, a noise level may be separately learned for each of three broadcast types (i.e., ground waves, BS, and CS). Note that, in the case of digital broadcast, a noise level is considerably low during normal reception, and therefore, is regarded as an arbitrary fixed value, and when noise is intermittently included in a program signal due to transmission error caused by a factor, such as weather or the like, the transmission error is detected and the frequency of noise contamination is stored. Based on the learning, a detection sensitivity is modified in order to avoid error detection of a scene change when there is noise contamination, and when the a reception condition returns to normal, the detection sensitivity is quickly returned to the previous one.

In addition, by using genre information about a program, the detection sensitivity determining section 33 can set a detection sensitivity suitable for a genre, so that the detection accuracy of a silent portion can be improved in the silent portion detecting section 14. In some genres, programs having low audio levels may be frequently inserted. Therefore, when scene change detection is performed based on an audio level, the number of detections can be previously predicted by obtaining genre information. For example, in the case of a classical music program or the like in digital broadcast, scenes having low audio levels frequently appear in the program.

As described above, according to the particular program detection device and method of the third embodiment of the present invention, in addition to the effects described in the first and second embodiments, by learning and storing a past noise level in association with program information, a current noise condition can be estimated based on past noise information, so that a silent portion can be detected, depending on the noise level.

Note that, in each of the above-described embodiments, the examples in which a scene change point is determined by detecting a silent portion of audio data included in a program signal, have been described. However, in the case of video data, it is often that light intensity significantly changes or blackout video is inserted at a scene change point. Therefore, a scene change point can also be determined by detecting the light intensity change point or the blackout inserted point of video data. For example, when genre information is used as in the particular program detection device 3 of the third embodiment, the number of detections can be predicted using the fact that a screen angle is frequently changed in a sports program, and is less frequently changed in a news program.

Typically, the methods performed by the particular program detection devices 1 to 3 described in the first to third embodiments are performed by predetermined program data which is stored in a storage device (a ROM, a RAM, a hard disk, etc.) which can execute the above-described process procedures, being interpreted and executed by a CPU. In this case, the program data may be introduced into the storage device via a recording medium, such as a CD-ROM, a flexible disk, or the like, or alternatively, may be executed directly on the recording medium.

Note that the functional blocks of the particular program detection devices 1 to 3 of the present invention, i.e., the noise level detecting section 12, the detection sensitivity determining sections 13, 23, and 33, the silent portion detecting section 14, the particular program determining section 15, the noise level learning sections 21 and 31, the noise level storing sections 22 and 32, and the program information obtaining section 34, may be implemented typically as an integrated circuit (LSI; LSI may be called IC, system LSI, super LSI or ultra LSI, depending on the packaging density) (see dashed lines in FIGS. 1, 8, and 9). The functional blocks may be mounted on one chip, or all or a part of the functional blocks may be mounted on one chip.

The integrated circuit is not limited to LSI. The integrated circuit may be achieved by a dedicated circuit or a general-purpose processor. Further, an FPGA (Field Programmable Gate Array) which can be programmed after LSI production or a reconfigurable processor in which connections or settings of circuit cells in LSI can be reconfigured, may be used.

Furthermore, if an integrated circuit technology which replaces LSI is developed by an advance in the semiconductor technology or other technologies derived therefrom, the functional blocks may be packaged using such a technology. A biotechnology may be applicable.

The particular program detection device of the present invention can be used in an accumulation-type camcorder, personal computer software for editing, or the like which needs to detect a particular program segment in a program signal of a television, a radio, or the like, and is particularly useful, for example, when a particular program segment needs to be reliably detected even in a program signal contaminated with noise.

The invention claimed is:

1. A particular program detection device for detecting a particular program segment in a program signal including audio data of a program, the particular program detection device comprising:
   a noise level detecting section operable to detect a noise level of the audio data included in the program signal;
   a detection sensitivity determining section operable to determine a detection sensitivity for detecting a particular program in the program signal, the detection sensitivity being determined based on the noise level detected by the noise level detecting section;
   a silent portion detecting section operable to (i) set a minimum hold value as a threshold value, wherein the minimum hold value holds a minimum value of the audio data included in the program signal, and, during a period of time while the minimum value is not detected in the audio data, the minimum hold value gradually increases from the minimum value at a predetermined rate with respect to an elapse of time, (ii) change the predetermined rate of increasing the minimum hold value, such that after a minimum time, during which the particular program can be detected, has elapsed since a time when the audio data is the minimum value, the minimum hold value is clipped at an audio level determined by the detection sensitivity determined by the detection sensitivity determining section, and (iii) detect a silent portion of the audio data included in the program signal using the set threshold value; and
   a particular program determining section operable to determine a time interval between each silent portion detected by the silent portion detecting section to determine the particular program segment.

2. The particular program detection device according to claim 1, further comprising:
   a noise level learning section operable to learn an association between the noise level currently detected by the noise level detecting section and a previously detected noise level; and
   a noise level storing section operable to store a learned noise level learned by the noise level learning section,
   wherein the detection sensitivity determining section determines the detection sensitivity based on the learned noise level stored in the noise level storing section.

3. The particular program detection device according to claim 2,
   wherein the particular program detection device further comprises a program information obtaining section operable to obtain program information from the program signal,
   wherein the noise level storing section stores the learned noise level in association with the program information obtained by the program information obtaining section, and
   wherein the detection sensitivity determining section obtains the learned noise level associated with the program information from the noise level storing section in accordance with the program information obtained by the program information obtaining section, and determines the learned noise level as the detection sensitivity to be used when the particular program is detected.

4. The particular program detection device according to claim 1, further comprising a broadcast reception section operable to receive broadcast waves carried in the program signal, and operable to output the received program signal to the noise level detecting section and the silent portion detecting section.

5. The particular program detection device according to claim 1, further comprising a data read section operable to read the program signal from a storage device in which the program signal is recorded, and operable to output the read program signal to the noise level detecting section and the silent portion detecting section.

6. The particular program detection device according to claim 1, wherein, when the particular program is a CM, a time constant, which causes the increase of the minimum hold value, is determined, such that the increase of the minimum hold value is clipped to a predetermined value in 15 seconds, which is a minimum time which can be taken by a CM.

7. A particular program detection method executed by a device for detecting a particular program segment in a program signal including audio data of a program, the particular program detection method comprising:
   detecting a noise level of the audio data included in the program signal;
   determining a detection sensitivity for detecting a particular program in the program signal, the detection sensitivity being determined based on the detected noise level;
   setting a minimum hold value as a threshold value, wherein the minimum hold value holds a minimum value of the audio data included in the program signal, and, during a period of time while the minimum value is not detected in the audio data, the minimum hold value gradually increases from the minimum value at a predetermined rate with respect to an elapse of time;
   changing the predetermined rate of increasing the minimum hold value, such that after a minimum time, during which the particular program can be detected, has elapsed since a time when the audio data is the minimum value, the minimum hold value is clipped at an audio level determined by the determined detection sensitivity;
   detecting a silent portion of the audio data included in the program signal using the set threshold value; and
   determining a time interval between each detected silent portion to determine the particular program segment.

8. A non-transitory computer-readable recording medium having a program recorded thereon, the program causing a program detection device to execute a method of detecting a particular program segment in a program signal including audio data of a program, the method comprising:
   detecting a noise level of the audio data included in the program signal;
   determining a detection sensitivity for detecting a particular program in the program signal, the detection sensitivity being determined based on the detected noise level;
   setting a minimum hold value as a threshold value, wherein the minimum hold value holds a minimum value of the audio data included in the program signal, and, during a period of time while the minimum value is not detected in the audio data, the minimum hold value gradually increases from the minimum value at a predetermined rate with respect to an elapse of time;
   changing the predetermined rate of increasing the minimum hold value, such that after a minimum time, during which the particular program can be detected, has elapsed since a time when the audio data is the minimum value, the minimum hold value is clipped at an audio level determined by the determined detection sensitivity;
   detecting a silent portion of the audio data included in the program signal using the set threshold value; and
   determining a time interval between each detected silent portion to determine the particular program segment.

9. An integrated circuit for use in a particular program detection device for detecting a particular program segment in a program signal including audio data of a program, wherein the integrated circuit includes circuits functioning as:
   a noise level detecting section operable to detect a noise level of the audio data included in the program signal;
   a detection sensitivity determining section operable to determine a detection sensitivity for detecting a particular program in the program signal, the detection sensitivity being determined based on the noise level detected by the noise level detecting section;
   a silent portion detecting section operable to (i) set a minimum hold value as a threshold value, wherein the minimum hold value holds a minimum value of the audio data included in the program signal, and, during a period of time while the minimum value is not detected in the audio data, the minimum hold value gradually increases from the minimum value at a predetermined rate with respect to an elapse of time, (ii) change the predetermined rate of increasing the minimum hold value, such that after a minimum time, during which the particular program can be detected, has elapsed since a time when the audio data is the minimum value, the minimum hold value is clipped at an audio level determined by the detection sensitivity determined by the detection sensitivity determining section, and (iii) detect a silent portion of the audio data included in the program signal using the set threshold value; and
   a particular program determining section operable to determine a time interval between each silent portion detected by the silent portion detecting section to determine the particular program segment.

* * * * *